(12) United States Patent
Poulos et al.

(10) Patent No.: US 10,223,799 B2
(45) Date of Patent: *Mar. 5, 2019

(54) DETERMINING COORDINATE FRAMES IN A DYNAMIC ENVIRONMENT

(71) Applicant: Microsoft Technology Licensing, LLC, Redmond, WA (US)

(72) Inventors: Adam G. Poulos, Sammamish, WA (US); Arthur Tomlin, Kirkland, WA (US); Tony Ambrus, Seattle, WA (US); Jeffrey Cole, Seattle, WA (US); Ian Douglas McIntyre, Redmond, WA (US); Drew Steedly, Redmond, WA (US); Frederik Schaffalitzky, Bellevue, WA (US); Georg Klein, Seattle, WA (US); Kathleen P. Mulcahy, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/474,687

(22) Filed: Mar. 30, 2017

(65) Prior Publication Data

US 2017/0206668 A1   Jul. 20, 2017

Related U.S. Application Data

(63) Continuation of application No. 14/267,755, filed on May 1, 2014, now Pat. No. 9,626,802.

(51) Int. Cl.
*G02B 27/01* (2006.01)
*G06T 19/00* (2011.01)
(Continued)

(52) U.S. Cl.
CPC ............ *G06T 7/248* (2017.01); *G02B 27/017* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS 6,681,629 B2   1/2004   Foxlin et al.
7,246,050 B2   7/2007   Sheridan
(Continued)

OTHER PUBLICATIONS

Foxlin E., "Head-tracking relative to a moving vehicle or simulator platform using differential inertial sensors" In Proceedings of Helmet and Head-Mounted Displays V, SPIE vol. 4021, AeroSense Symposium, Apr. 24, 2000, 12 pages.
(Continued)

*Primary Examiner* — Yingchun He
(74) *Attorney, Agent, or Firm* — Alleman Hall Creasman & Tuttle LLP (57) ABSTRACT

Embodiments are disclosed for methods and systems of distinguishing movements of features in a physical environment. For example, on a head-mounted display device, one embodiment of a method includes obtaining a representation of real-world features in two or more coordinate frames and obtaining motion data from one or more sensors external to the head-mounted display device. The method further includes distinguishing features in one coordinate frame from features in another coordinate frame based upon the motion data.

20 Claims, 7 Drawing Sheets

(51) Int. Cl.
| | |
|---|---|
| *G06T 7/246* | (2017.01) |
| *G06T 7/60* | (2017.01) |
| *G06K 9/62* | (2006.01) |
| *G06K 9/46* | (2006.01) |
| *G06F 3/01* | (2006.01) |
| *G06F 3/0481* | (2013.01) |
| *G06K 9/00* | (2006.01) |
| *G06T 7/20* | (2017.01) |
| *G06K 9/20* | (2006.01) |

(52) U.S. Cl.
CPC .......... *G06F 3/017* (2013.01); *G06F 3/04815* (2013.01); *G06K 9/00624* (2013.01); *G06K 9/00791* (2013.01); *G06K 9/00832* (2013.01); *G06K 9/4604* (2013.01); *G06K 9/6215* (2013.01); *G06T 7/20* (2013.01); *G06T 7/60* (2013.01); *G06T 19/006* (2013.01); *G02B 2027/014* (2013.01); *G02B 2027/0138* (2013.01); *G02B 2027/0141* (2013.01); *G02B 2027/0178* (2013.01); *G06K 9/00208* (2013.01); *G06K 9/00671* (2013.01); *G06K 9/2018* (2013.01); *G06T 2207/30252* (2013.01)

(56) References Cited

U.S. PATENT DOCUMENTS

| | | |
|---|---|---|
| 7,423,553 B2 | 9/2008 | Yokokohji et al. |
| 8,203,605 B1 | 6/2012 | Starner |
| 2004/0149036 A1 | 8/2004 | Foxlin et al. |
| 2010/0253593 A1 | 10/2010 | Seder et al. |
| 2012/0206597 A1 | 8/2012 | Komoto et al. |
| 2012/0242694 A1 | 9/2012 | Hotta et al. |
| 2013/0002525 A1 | 1/2013 | Foote |
| 2015/0294505 A1 | 10/2015 | Atsmon |

OTHER PUBLICATIONS

Foxlin E. et al., "FlightTracker: A Novel Optical/Inertial Tracker for Cockpit Enhanced Vision" In Proceedings of Third IEEE and ACM International Symposium on Mixed and Augmented Reality, Nov. 2, 2004, Washington DC, USA, 10 pages.

ISA European Patent Office, International Search Report and Written Opinion Issued in PCT Application No. PCT/US2015/027860, dated Aug. 7, 2015, WIPO, 12 pages.

IPEA European Patent Office, Second Written Opinion Issued in PCT Application No. PCT/US2015/027860, dated Mar. 21, 2016, WIPO, 6 pages.

IPEA European Patent Office, International Preliminary Report on Patentability Issued in PCT Application No. PCT/US2015/027860, dated Jul. 4, 2016, WIPO, 12 pages.

United States Patent and Trademark Office, Non-Final Office Action Issued in U.S. Appl. No. 14/267,755, dated Feb. 8, 2016, 18 pages.

United States Patent and Trademark Office, Final Office Action Issued in U.S. Appl. No. 14/267,755, dated Aug. 5, 2016, 19 pages.

United States Patent and Trademark Office, Notice of Allowance Issued in U.S. Appl. No. 14/267,755, dated Dec. 12, 2016, 9 pages.

"First Office Action and Search Report Issued in Chinese Patent Application No. 201580021525.6", dated Sep. 3, 2018, 14 pages.

DETERMINING COORDINATE FRAMES IN A DYNAMIC ENVIRONMENT

CROSS REFERENCE TO RELATED APPLICATIONS

This application is a continuation of U.S. patent application Ser. No. 14/267,755, filed on May 1, 2014, and titled "DETERMINING COORDINATE FRAMES IN A DYNAMIC ENVIRONMENT", the entire disclosure of which is hereby incorporated herein by reference.

BACKGROUND

A physical environment may be mapped by a computer using various sensors to detect locations and/or movement of objects and other features in the environment. However, some environments may be dynamic and include features that move relative to one another. In such environments, applications such as gesture recognition and real-world visual augmentation may be affected by the movement of the real-world features.

SUMMARY

Embodiments are disclosed that relate to determining, via a computing device, coordinate frames for real-world objects that may move relative to one another. For example, one disclosed embodiment provides a method for determining coordinate frames in a physical environment. The method includes obtaining a representation of real-world features in two or more coordinate frames, and obtaining motion data from one or more sensors external to the head-mounted display device. The method further comprises distinguishing features in one coordinate frame from features in another coordinate frame based upon the sensor data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality experiences may be provided on a see-through display device, such as a head-mounted device (HMD), by displaying virtual images on a see-through display through which a real-world environment is viewable. Real-world objects may be detected and located via data from outward-facing image sensors on the HMD, and virtual images may then be positioned on the display at locations that augment the real-world objects.

In order to achieve an augmented reality experience that is properly aligned to a real-world environment from a perspective of a wearer of the HMD, movements of the wearer may be tracked to help determine where to display content. However, movements of the wearer may arise from multiple motion sources, such as a moving vehicle in which the wearer is located. Such relative motion may complicate the task of aligning virtual imagery with real-world objects.

Figure 1A:
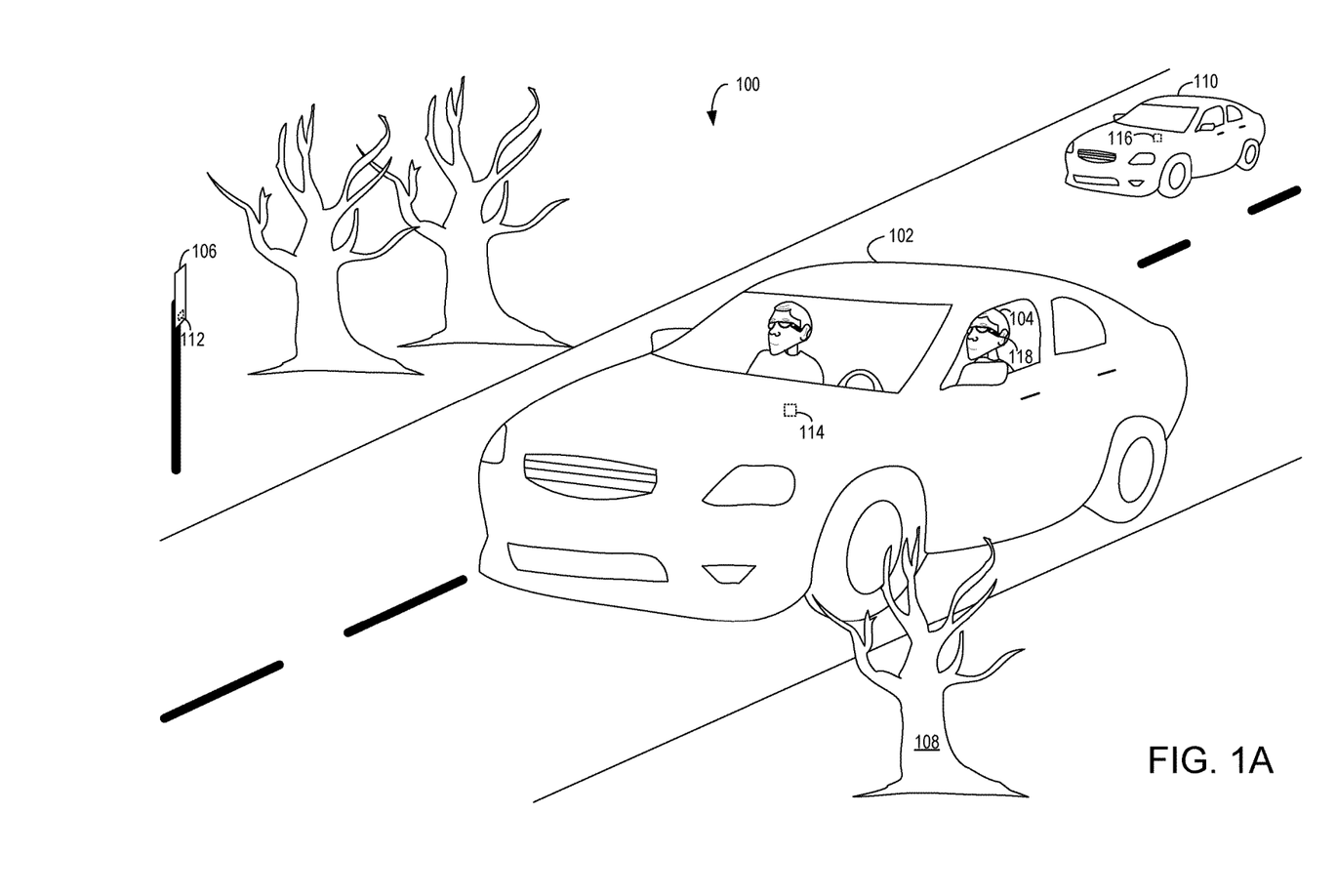
FIGS. 1A-1C show an example physical environment and illustrate the display of virtual imagery to augment the environment according to an embodiment of the present disclosure.
Figure 1B:
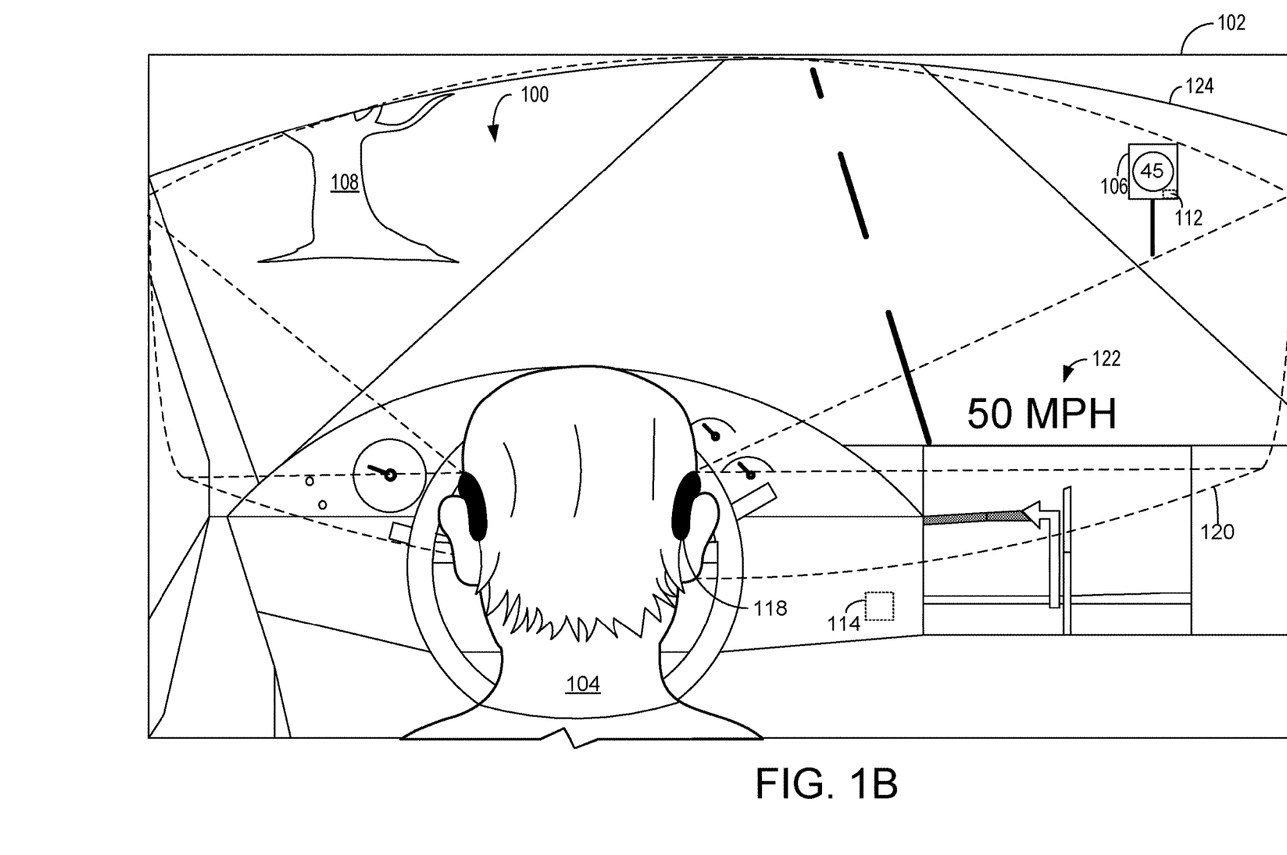
Figure 1C:
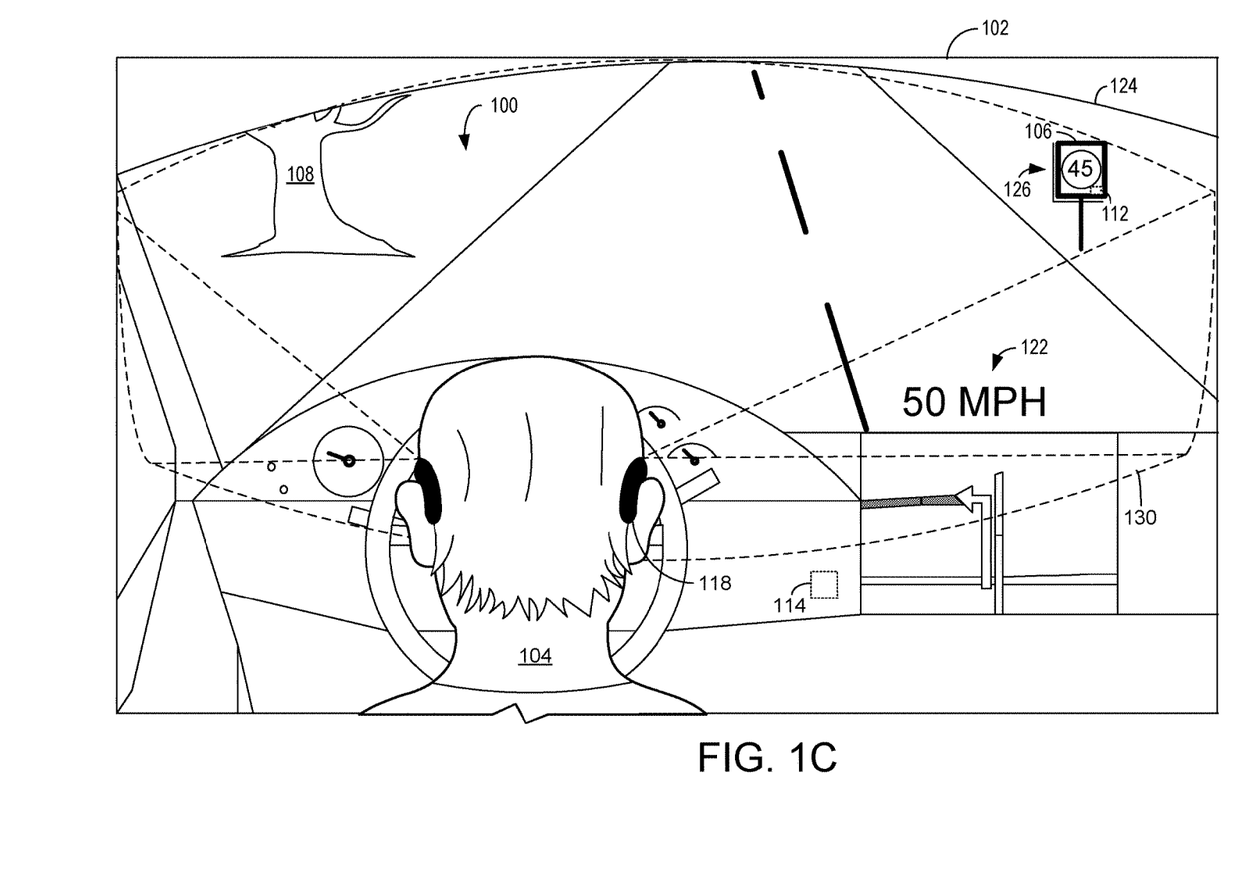

Thus, embodiments are disclosed herein that relate to distinguishing movements of real-world features in different coordinate frames via motion data received from one or more sensors, which may be external to the augmented reality display device, to assist with proper alignment of virtual image augmentations to the real-world features. FIGS. 1A-1C show an example physical environment 100 in which sensor data may be used to associate real-world features captured in image data with different identified coordinate frames. First, FIG. 1A shows a vehicle 102 traveling down a road and being driven by a driver 104. As the vehicle moves down the road, different objects or other features may move relative to one another. For example, vehicle 102 may be moving relative to substantially stationary real-world objects, such as sign 106 and trees 108. Vehicle 102 may further be moving relative to vehicle 110. Further, while driver 104 may be moving in concert with vehicle 102, (e.g., relative to the stationary real-world objects and the other vehicle 110), driver 104 also may move relative to the vehicle, such as when driver 104 turns to look a different direction or makes other movements relative to the coordinate frame of vehicle 102. Accordingly, in this example, the sign 106 and trees 108 may be considered as being within first coordinate frame, vehicle 102 in a second coordinate frame, vehicle 110 in a third coordinate frame, and driver 104 in a fourth coordinate frame (when driver 104 moves relative to vehicle 102).

Distinguishing a coordinate frame associated with the driver and a different coordinate frame associated with the vehicle may enable an augmented reality display device to compensate for movement of the vehicle when determining movement of the driver. This may allow information regarding the motion of driver 104 resulting from being in vehicle 102 to be subtracted from motion signal sensors associated with the coordinate frame of driver 104, thereby helping to obtain information regarding motion of driver 104 relative to vehicle 102. Further, the use of motion data from an IMU or other motion sensor may simplify the determination of such coordinate frames relative to determining relative motion of physical world features from image data alone.

Coordinate frames within the physical environment may be determined based upon data from any suitable sensors. For example, motion sensors such as inertial measurement units and/or other suitable sensors may be located in or on objects within the environment. As a more specific example, sign 106 is illustrated as including a sensor 112 affixed and/or integrated within the sign. Sensor 112 may measure and broadcast and/or transmit a location and/or motion characteristics associated with the sign 106. For example, sensor 112 may indicate the location of the sign (e.g., in absolute or relative coordinates, such as latitude/longitude, etc.). It will be understood that such a sensor may be located in any other suitable position in the coordinate frame of the sign, and may be configured to communicate sensor data in any suitable manner. Further, motion relative to a coordinate frame of the earth also may be determined via other sensors, such as a global positioning system (GPS) sensor.

Likewise, vehicles 102 and 110 may include sensors 114 and 116, respectively. Further, a head-mounted display device (HMD) 118 worn by driver 104 may include one or more sensors, as described below with regard to FIG. 5. Each of these objects may include any suitable number, type, and/or combination of sensors for obtaining information about the location and relative motion of real-world features. For example, the sensors may include one or more cameras (e.g., depth, infrared, visible light, stereoscopic, etc.), inertial measurement units (IMUs), accelerometers, gyroscopes, GPS sensors, magnetometers, etc. Similarly, sensor 114 may provide sensor data regarding location and/or motion characteristics of vehicle 102 over time. Further, sensor(s) of HMD 118 may provide a motion signal regarding location and/or motion characteristics of driver 104.

Devices having such sensors may communicate with one another, e.g. via direct pairing, via a computer network, and/or in any other manner. In one non-limiting embodiment, devices configured to provide sensor data to other devices may output a beacon signal to alert other devices of the availability of sensor data, and other devices may connect with the beaconing device, either automatically or via a manual pairing process. Once paired with HMD 118, a sensor device may then provide sensor data to the HMD.

After pairing, data may be received from the sensors to help distinguish movements of real world features relative to one another. For example, the HMD 118 may receive GPS data from GPS units in vehicles 102 and 110 and determine, based on the received GPS data, relative movement of the two vehicles. This may help to display virtual objects in consistent and stable locations relative to physical, real-world objects from the perspective of a user of a HMD. IMU and/or other suitable data also may be used to distinguish the motion of the vehicles from one another.

FIGS. 1B and 1C show example fields of view (120 and 130, respectively) from the perspective of driver 104 of FIG. 1A. In FIG. 1B, a virtual object 122, illustrated here as a textual representation of the speed of the vehicle, is displayed in a fixed location relative to the vehicle 102. In the depicted example, the virtual object 122, when viewed through a see-through display of the HMD 118, may appear to overlay a portion of a windshield 124 of the vehicle. It may be desirable to adjust the position on the HMD 118 at which virtual object 122 is displayed in response to relative motion between the vehicle and HMD so that the virtual object appears stationary in location. However, an inertial motion unit on the HMD may indicate that the HMD is moving even when the detected motion is actually motion of the car carrying the HMD. Thus, to distinguish motion of the HMD caused by the vehicle from motion of the HMD relative to the vehicle, sensor data may be obtained by the HMD from sensor 114 (e.g. an IMU located in the car, a GPS system of the vehicle, etc.), and the motion of the car may be subtracted from the motion of the HMD. In this manner, a representation of the motion of the HMD relative to the vehicle may be obtained. By differentiating movement of the HMD 118 caused by user motion compared to movement caused by vehicle motion, rendering of the virtual object 122 by the HMD 118 may be adjusted to adjust for relative motion between the HMD and the vehicle.

FIG. 1C shows an example of a virtual object 126 comprising an augmentation to a real-world feature outside of vehicle 102, namely sign 106. The movement of HMD 118 caused by vehicle 102 as well as the movement of HMD 118 relative to the vehicle 102 may affect the perceived location of sign 106 through the see-through display of HMD 118. Thus, a coordinate frame of sign 106 may be determined, for example, via a motion signal determined from an IMU in HMD 118, as the apparent motion of sign 106 in image data captured by HMD 118 will correspond to the motion of the vehicle and HMD as sensed by this sensor. GPS data from vehicle 102 and/or IMU data from vehicle 102 also may be used to determine a coordinate frame for sign 106. This may allow the perceived location of the virtual object 126 to be updated accordingly.

Relative movement of objects in the physical environment (e.g., substantially stationary objects, vehicles, HMDs, etc.) may be determined by sensors on the vehicle 102 and/or the HMD 118 alone in some embodiments. In other embodiments, such relative movement may be determined using sensors in a coordinate frame of the earth, along with sensors on the vehicle and/or HMD. The fixed sensors may be distributed throughout a physical environment to provide readily-available indications of earth-fixed locations/objects in the real-world. For example, earth-fixed sensors may be integrated within public or private infrastructure (e.g., in roads, buildings, traffic signals, etc.), located in or on natural features (e.g., buried in/affixed to land, attached to plant life, etc.), orbiting earth at a fixed relative location, and/or provided/distributed in any other suitable manner. Sensors incorporated into objects that may be moved may likewise be made readily available to other devices via any suitable mechanism or mechanisms.

Figure 2:
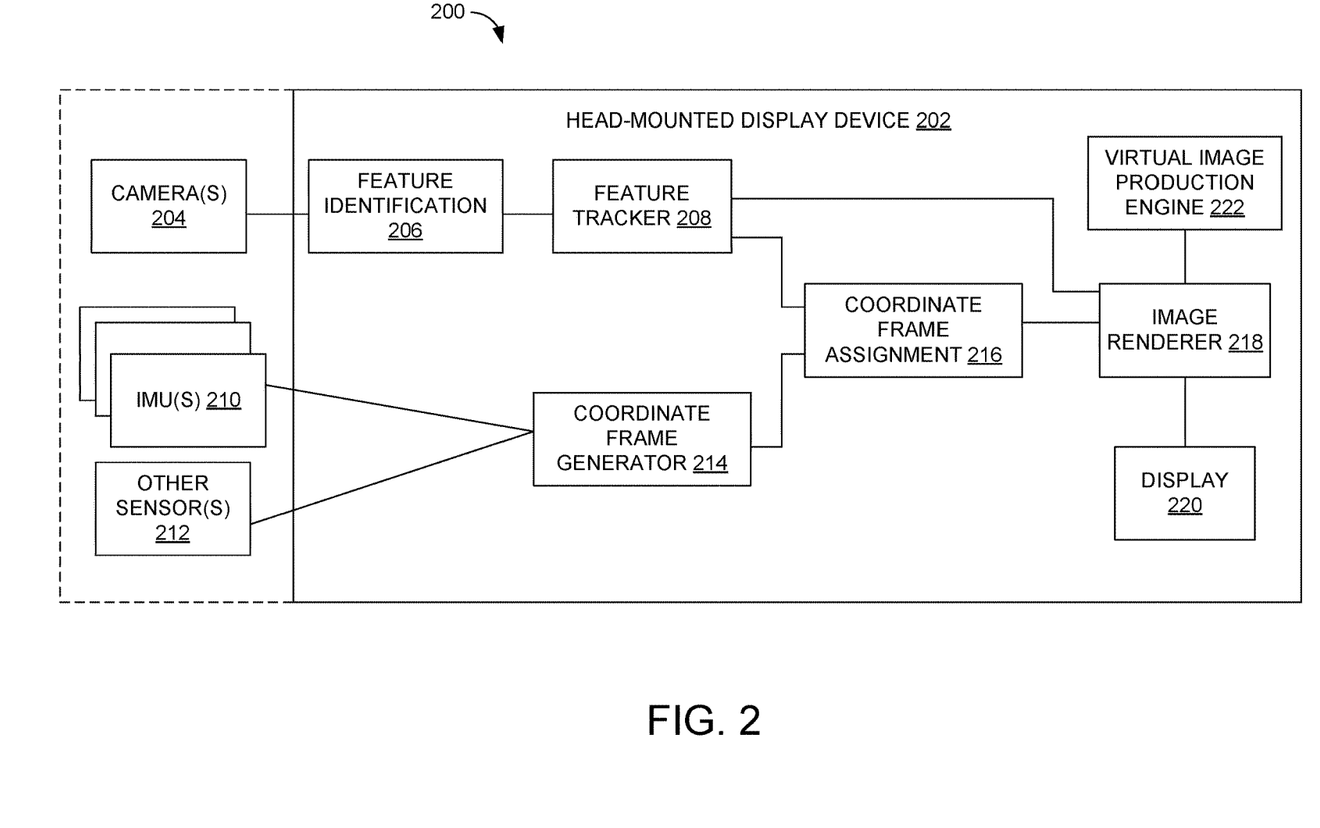
FIG. 2 is a block diagram of an example coordinate frame detection and assignment system according to an embodiment of the present disclosure.

FIG. 2 shows a block diagram depicting an example coordinate frame detection and assignment system 200. System 200 may be at least partially included in a head-mounted display device 202, such as HMD 118 of FIG. 1, or may be incorporated in any other suitable device. System 200 is also depicting as comprising components that communicate with the HMD but may not be incorporated with the HMD, such as motion sensors for coordinate frames external to the HMD.

System 200 comprises one or more cameras 204 configured to image an environment and provide image data to a feature identification module 206. The one or more cameras 204 may include any combination of suitable camera(s) located remotely (e.g., externally) to the head-mounted display device 202, and located on the head-mounted display device 202. The one or more cameras 204 may include any suitable type(s) and number of cameras. For example, HMD 202 may include a stereo pair of RGB (red/green/blue) cameras coupled to the HMD, a single RGB camera, one or more depth cameras, combinations thereof, etc.

The feature identification module 206 may receive and analyze the image data from the one or more cameras 204 to identify one or more real-world features in the physical environment imaged by the camera(s). For example, the feature identification module 206 may detect physical objects, edges of objects, corners of objects, and/or any other suitable structures, and may perform any suitable image analysis to identify the real-world features.

The feature identification module 206 may provide identifying information regarding detected real-world features to a feature tracker 208. The feature tracker 208 may track the locations of the real-world features over time in order to determine one or more motion characteristics associated with the real-world features. For example, based on the data from the feature identification module 206, the feature tracker 208 may determine speed, acceleration, direction, velocity, and/or other suitable motion characteristics of the tracked features.

Additionally, motion sensors such as inertial measurement units (IMUs) 210 and other sensors 212 configured to provide information relating to motion may transmit motion signals to a coordinate frame generator 214. The other sensor(s) 212 may include any suitable sensor or sensors useable to detect motion of real-world features, including but not limited to accelerometers, gyroscopes, GPS units, cameras, etc. The IMUs 210 and other sensor(s) 212 may be positioned in any combination of locations in the physical environment. For example, one or more IMUs 210 and/or sensor(s) 212 may be located externally to the head-mounted display device 202, and one or more IMUs 210 and/or sensors 212 may be integrated within the head-mounted display device 202. External IMUs 210 and/or sensor(s) 212 may be fixed relative to one or more objects in the physical environment, as described above with respect to sensors 112, 114, and 116 in FIGS. 1A-1C, and thus are associated with a coordinate frame of those objects.

Coordinate frame generator 214 may analyze the motion signals, and generate coordinate frames for each detected motion signal, wherein the coordinate frame is fixed with regard to a position of the sensor from which the motion signal was received.

The feature tracker 208 and the coordinate frame generator 214 may each provide input to a coordinate frame assignment module 216. The coordinate frame assignment module 216 may compare motion characteristics of features tracked by the feature tracker 208 to motion characteristics associated with each coordinate frame generated by the coordinate frame generator 214. Features having motion characteristics matching (e.g., identical to and/or within a threshold range of) motion characteristics of a coordinate frame may be assigned to that coordinate frame.

Information from the feature tracker 208 and/or the coordinate frame assignment module 216 may be provided to an image renderer 218. Image renderer 218 may be configured to render an augmented reality display output for display on a display 220 (e.g., a see-through display) of head-mounted display device 200. For example, the image renderer 218 may receive one or more virtual objects from a virtual image production engine 222 defining image elements positionally associated with a real world object. The image renderer 218 may control a display location of the virtual object(s) based on a location of the real world object as perceived by the user through the see-through display 220, the location of the real-world object being determined via information received by the feature tracker 208, for example. The image renderer 218 may update a location at which the virtual object is displayed based upon a detected change in a location of the real world object relative to a coordinate frame of the head-mounted display device, as determined based upon information from feature tracker 208 and coordinate frame assignment module 216. Knowledge of the coordinate frame of the real-world object may allow the display of the virtual object to remain in a fixed position relative to the real-world object.

Figure 3:
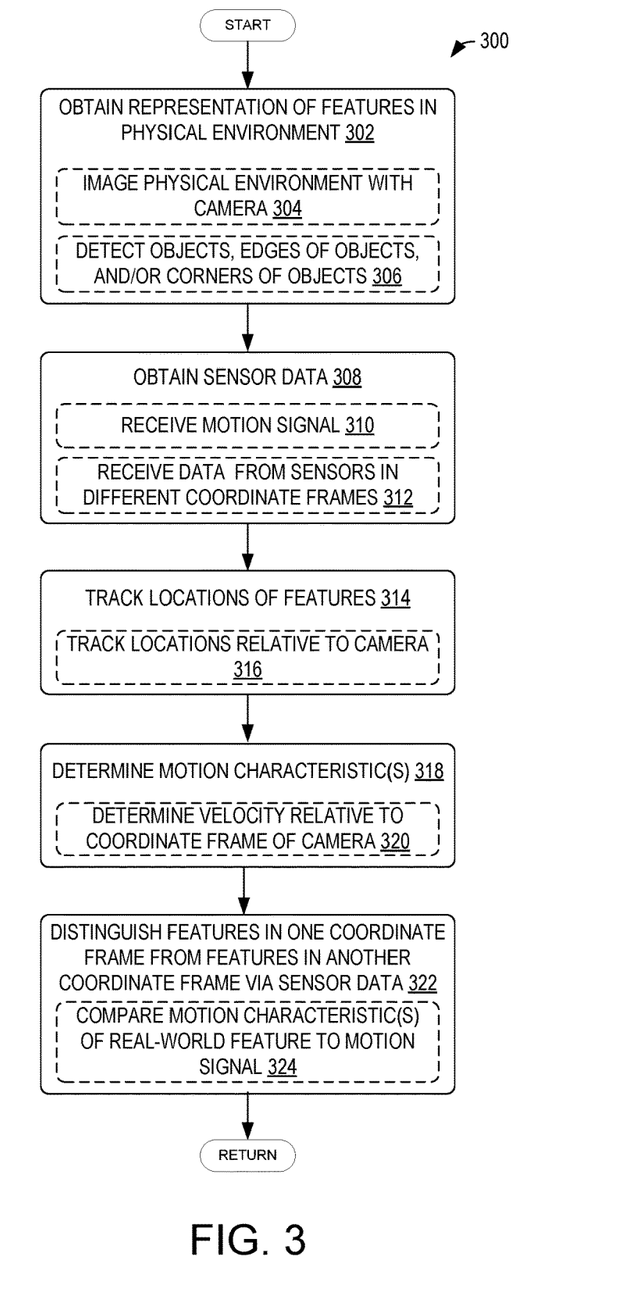
FIG. 3 is a flow diagram depicting a method for determining coordinate frames in a physical environment according to an embodiment of the present disclosure.

FIG. 3 shows a flow diagram depicting an embodiment of a method 300 for determining coordinate frames in a physical environment. Method 300 may be performed by a head-mounted display device, such as HMD 118 of FIGS. 1A-C, or any other suitable type of device. At 302, method 300 includes obtaining a representation of real-world features in a physical environment. For example, the representation may be obtained by imaging the physical environment with a camera, as indicated at 304. The real-world features may include physical objects, edges of the objects, corners of the objects, and/or any other suitable object features, as indicated at 306.

As mentioned above, real world features may have different motion characteristics relative to each other due to relative motion between coordinate frames of objects in the physical world. Thus, at 308, method 300 includes obtaining motion data from one or more sensors. The sensors may be external to the head-mounted display device and/or integrated within/mounted to the head-mounted display device. Further, sensor data may be obtained from any suitable type of sensor, including but not limited to those discussed above with respect to FIGS. 1A-1C. Obtaining the sensor data may include receiving a motion signal, as indicated at 310. Further, obtaining the sensor data may include receiving data from sensors associated with different coordinate frames, as indicated at 312 and as described in more detail above. For example, coordinate frames may be identified based upon motion data received from sensors that describes motion characteristics of features in the physical environment.

Method 300 further includes tracking a location of real-world features identified in the image data, as indicated at 314. For example, the location of real-world features may be tracked relative to a location of a camera of the HMD, as indicated at 316. The locations may be tracked based on the sensor data obtained at 308 as applied to features in the physical environment imaged as described at 304/306. At 318, method 300 includes determining one or more motion characteristics based on the locations as tracked over time.

Method 300 further includes, at 322, distinguishing one or more real-world features in one coordinate frame from one or more features in another coordinate frame via the sensor data. For example, method 300 may include comparing motion characteristic(s) of real-world features as determined from image data to motion data received from one or more sensors (e.g., a sensor of a head-mounted display device and/or a sensor associated with another real-world feature), as indicated at 324. In this way, motion characteristics corresponding to identified real-world features may be compared to the sensor data to associate each real-world feature with a detected coordinate frame. Further, movement of one coordinate frame (e.g. a HMD coordinate frame) relative to another coordinate frame may be isolated by subtracting motion signals for the two coordinate frames.

In some instances, physical world features may switch from being in a single coordinate frame to being in different coordinate frames. For example, where a person wearing an HMD is standing at a crosswalk observing a vehicle stopped at a stoplight, the vehicle and the physical environment around the vehicle may be in a same coordinate frame. However, when the vehicle resumes travel after the light turns green, the vehicle and the physical environment outside the vehicle are in different coordinate frames.

Figure 4:
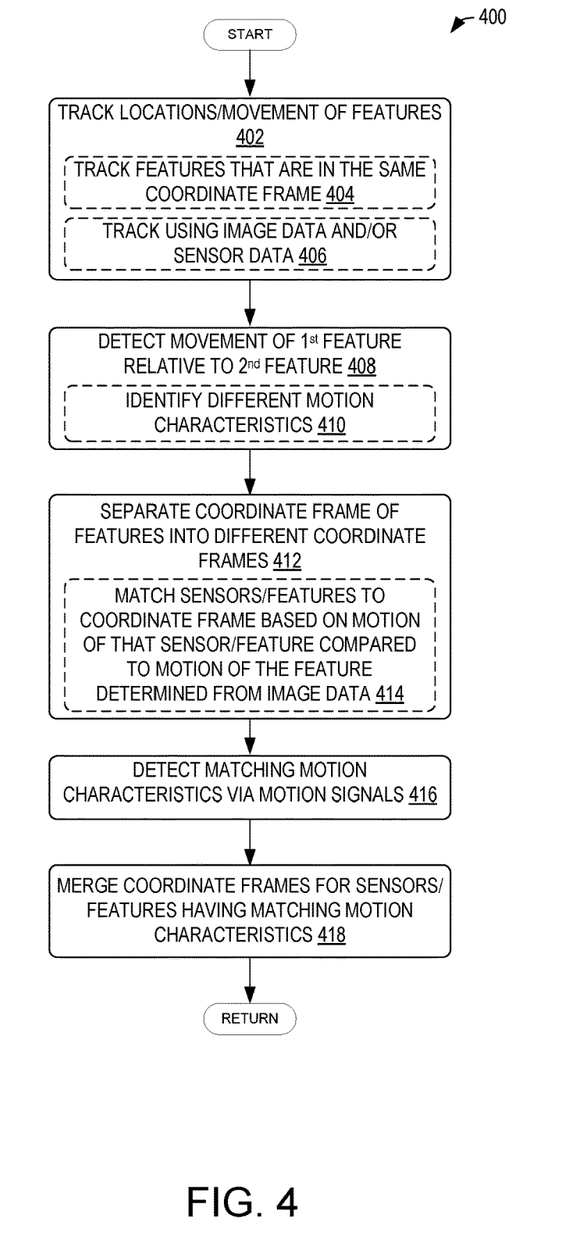
FIG. 4 is a flow diagram depicting a method for separating and merging coordinate frames according to an embodiment of the present disclosure.

Thus, FIG. 4 shows a flow diagram depicting a method 400 for separating and merging coordinate frames for real-world features based upon the commencement and cessation of relative movement between the real-world features. Method 400 may be performed by a head-mounted display device and/or any other suitable computing device.

Method 400 includes, at 402, tracking locations and/or movements of real-world features. At least some of the tracked real-world features may be in the same coordinate frame, as indicated at 404. The real-world features may be tracked using image data and/or other sensor data, as described above with respect to FIG. 2.

Method 400 further includes, at 408, detecting movement of a first real-world feature relative to a second real-world feature. The motion may be detected in any suitable manner, such as by identifying different motion characteristics of features at 410 via image data and/or motion sensor data. For example, once the vehicle begins to move, motion data received from sensors may indicate movement. Further, where motion data is received from multiple sensors, different sensors in different coordinate frames may indicate relative motion to one another by detecting different motion characteristics.

At 412, method 400 includes separating the original coordinate frame shared by the physical world features into different coordinate frames for different features corresponding to the relative motion between features. For example, coordinate frames may be identified via motion data received from one or more sensors. This further may comprise matching physical world features to different identified coordinate frames based on detected/measured motion of that sensor/feature as compared to a motion of the feature determined from image data, as indicated at 414.

Motion characteristics of tracked real-world features may be tracked continuously (e.g. via periodic updating). At some point, relative motion between the first and second features may cease such these features are part of a same coordinate frame. As such, at 416, method 400 includes detecting matching motion characteristics, such as matching acceleration data, matching velocity data, matching direction data, etc. from the motion sensor data. Image data also may be used to detect matching motion. In response to detecting matching motion characteristics, method 400 includes merging coordinate frames for sensors and/or associated features having matching motion characteristics, as indicated at 418. For example, if, after moving along the road, the vehicle in the above example again comes to a stop, the coordinate frame associated with the vehicle may once again merge with the coordinate frame associated with the stationary object(s) in the physical environment.

Thus, by receiving motion data from sensors associated with coordinate frames, sources of motion in dynamic environments may be distinguished and associated with different coordinate frames. As described above, this may facilitate displaying an augmented reality presentation relative to real-world features while compensating for actual movements of features relative to one another.

Figure 5:
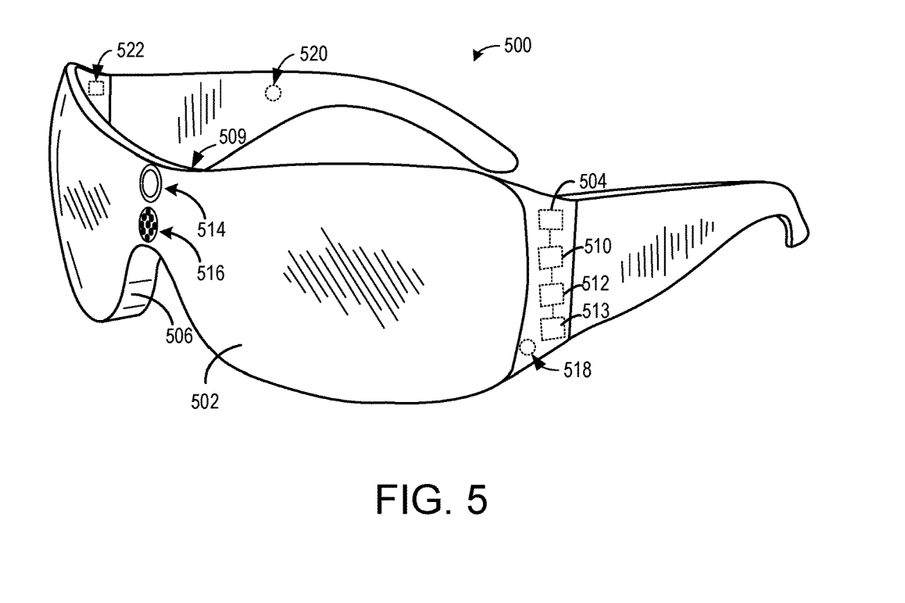
FIG. 5 shows an example of a head-mounted display device according to an embodiment of the present disclosure.

FIG. 5 illustrates an example HMD device 500 in the form of a pair of wearable glasses with a transparent display 502. It will be appreciated that in other examples, the HMD device 500 may take other suitable forms in which a transparent, semi-transparent, and/or variably transparent display is supported in front of a viewer's eye or eyes. It will also be appreciated that the HMD device 118 shown in FIGS. 1A-1C may take the form of the HMD device 500, as described in more detail below, or any other suitable HMD device.

The HMD device 500 includes an image generation system, indicated schematically at 504 that enables images such as holographic and/or virtual objects to be delivered to the eyes of a wearer of the HMD via the transparent display 502. The transparent display 502 and image generation system 504 may be configured to visually augment an appearance of a physical environment to a wearer viewing the physical environment by presenting images via the transparent display 502.

The transparent display 502 may also be configured to enable a user to view a physical, real-world object in the physical environment through one or more partially transparent pixels that are displaying a virtual object representation. As shown in FIG. 5, in one example the transparent display 502 may include image-producing elements located within lenses 506 (such as, for example, a see-through Organic Light-Emitting Diode (OLED) display). As another example, the transparent display 502 may include a light modulator on an edge of the lenses 506 or otherwise configured to deliver an image to the lenses 506. In this example, the lenses 506 may serve as a light guide for delivering light from the light modulator to the eyes of a user. Such a light guide may enable a user to perceive a 3D holographic image located within the physical environment that the user is viewing, while also allowing the user to view physical objects in the physical environment, thus creating a mixed reality environment.

The HMD device 500 may also include various sensors and related systems. For example, the HMD device 500 may include a gaze tracking system that includes one or more image sensors, such as inward facing sensor 509, configured to acquire image data in the form of gaze tracking data from a user's eyes. Provided the user has consented to the acquisition and use of this information, the gaze tracking system may use this information to track a position and/or movement of the user's eyes. In one example, the gaze tracking system includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes. Images of the glints and of the pupils as determined from image data gathered from the image sensors may be used to determine an optical axis of each eye. Using this information, the gaze tracking system may then determine a direction the user is gazing. The gaze tracking system may additionally or alternatively determine at what physical or virtual object the user is gazing. Such gaze tracking data may then be provided to the HMD device 500. It will also be understood that the gaze tracking system may have any suitable number and arrangement of light sources and image sensors.

The HMD device 500 may also include sensor systems that receive physical environment data from the physical environment. For example, the HMD device 500 may also include a head tracking system 510 that utilizes one or more motion sensors 512, such as an IMU, to capture head pose data and thereby enable position tracking, direction and orientation sensing, and/or motion detection of the user's head. As described in more detail above, information from such a sensor may allow motion due to movement of the HMD device 500 by a user to be distinguished from motion arising from other sources.

In one example, motion sensors 512 of the head tracking system 510 may comprise one or more inertial measurement units configured as a three-axis or three-degree of freedom position sensor system. This example position sensor system may, for example, include three gyroscopes to indicate or measure a change in orientation of the HMD device 500 within 3D space about three orthogonal axes (e.g., x, y, z) (e.g., roll, pitch, yaw). In another example, head tracking system 510 may comprise an inertial measurement unit configured as a six-degree of freedom position sensor system. This example position sensor system may, for example, include three accelerometers and three gyroscopes to indicate or measure a change in location of the HMD device 500 along the three orthogonal axes and a change in device orientation about the three orthogonal axes.

Head tracking system 510 may also support other suitable positioning techniques, such as GPS 513 or other global navigation systems. Further, while specific examples of position sensor systems have been described, it will be appreciated that any other suitable position sensor systems may be used. For example, head pose and/or movement data may be determined based on sensor information from any combination of sensors integrated within the HMD device 500, mounted on the HMD device 500, mounted on the wearer, and/or external to the wearer/HMD device 500 including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., WIFI antennas/interfaces, Bluetooth antennas/interfaces, etc.) for communicating with external sensors and/or external devices having sensors, etc.

In some examples the HMD device 500 may also include an optical sensor system that utilizes one or more outward facing sensors, such as optical sensor 514 on HMD device 500, to capture image data. The outward facing sensor(s) may detect movements within its field of view, such as gesture-based inputs or other movements performed by a user or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 516. It will be appreciated that any other suitable depth camera may be used within the scope of the present disclosure.

The outward facing sensor(s) may capture images of the physical environment in which a user is situated. With respect to the HMD device 500, in one example a mixed reality display program may include a 3D modeling system that uses such captured images to generate a virtual environment that models the physical environment surrounding the user.

The HMD device 500 may also include a microphone system that includes one or more microphones, such as microphone 518 on HMD device 500, that capture audio data. In other examples, audio may be presented to the user via one or more speakers, such as speaker 520 on the HMD device 500.

The HMD device 500 may also include a controller, such as controller 522 on the HMD device 500. The controller may include a logic machine and a storage machine, as discussed in more detail below with respect to FIG. 6, that are in communication with the various sensors and systems of the HMD device and display. In one example, the storage subsystem may include instructions that are executable by the logic subsystem to receive signal inputs from the sensors, determine a pose of the HMD device 500, and adjust display properties for content displayed on the transparent display 502.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
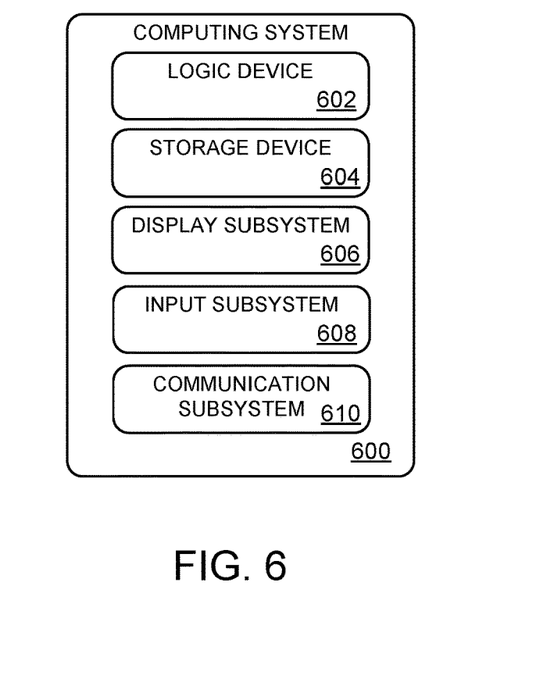
FIG. 6 is a block diagram of an example embodiment of a computing system.

FIG. 6 schematically shows a non-limiting embodiment of a computing system 600 that can enact one or more of the methods and processes described above. Computing system 600 is shown in simplified form. Computing system 600 may take the form of one or more head-mounted display devices, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic devices configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold machine-readable instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 600 implemented to perform a particular function. In some cases, a module may be instantiated via logic machine 602 executing instructions held by storage machine 604. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology, such as displays 502 of the HMD 500 illustrated in FIG. 5. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 510 of FIG. 5; and/or any other suitable sensor.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet. For example, communication subsystem 610 may allow the computing system 600 to send and/or receive data from external motion-related data sources, such as IMUs and other sensors located remote from and external to the computing system 600.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a head-mounted display device, a method comprising:
    obtaining via image data from a camera of the head-mounted display device a representation of real-world features in two or more coordinate frames;
    displaying, on a see-through display of the head-mounted display device, a first virtual object at a location relative to a first real-world feature in a first coordinate frame in a field of view of the head-mounted display device and a second virtual object at a location relative to a second real-world feature in a second coordinate frame in the field of view of the head-mounted display device;
    determining relative motion characteristics of the first coordinate frame and the second coordinate frame based upon the image data;
    distinguishing features in the first coordinate frame from features in the second coordinate frame based upon the relative motion characteristics; and
    updating the location of the first virtual object based upon a relative motion of the first coordinate frame and updating the location of the second virtual object based upon a relative motion of the second coordinate frame.

2. The method of claim 1, further comprising tracking locations of the real-world features relative to the camera over time via the image data.

3. The method of claim 2, further comprising determining a motion characteristic for each of the real-world features based on tracking changes in the locations of the real-world features.

4. The method of claim 3, further comprising obtaining motion data from one or more sensors of the head-mounted display device, wherein distinguishing features in the first coordinate frame from features in the second coordinate frame comprises comparing the motion characteristic for each real-world feature to the motion data from the one or more sensors.

5. The method of claim 4, wherein the one or more sensors includes an inertial measurement unit.

6. The method of claim 5, further comprising:
obtaining motion data from the inertial measurement unit; and
displaying, on the see-through display of the head-mounted display device, a virtual object at a location relative to a selected real-world object in the field of view, and updating the location of the virtual object based upon the motion data.

7. The method of claim 4, wherein a first sensor is associated with the first coordinate frame, the method further comprising associating a first real-world feature to the first coordinate frame by comparing the motion characteristic determined for the first real-world feature with motion data from the first sensor.

8. The method of claim 7, wherein the one or more sensors includes a second sensor associated with the second coordinate frame.

9. The method of claim 1, wherein obtaining the representation of the real-world features comprises detecting one or more objects, corners of objects, and/or edges of objects in a physical environment.

10. The method of claim 1, wherein the head-mounted display device further comprises a global positioning sensor unit.

11. The method of claim 10, further comprising isolating movement of the head-mounted display device relative to a moving element in a second coordinate frame by subtracting the relative motion of the first coordinate frame from the relative motion of the second coordinate frame.

12. A head-mounted display device, comprising:
a plurality of sensors including a camera;
a see-through display;
a logic machine; and
a memory holding instructions executable by the logic machine to
obtain via the camera a representation of real-world features in two or more coordinate frames;
determine relative motion characteristics of a first coordinate frame and a second coordinate frame based upon the representation;
distinguish a first real-world feature in the first coordinate frame from a second real-world feature in the second coordinate frame based upon the relative motion characteristics; and
display a first virtual object at a location relative to the first real-world feature in the first coordinate frame based upon the relative motion characteristics and display a second virtual object at a location relative to the second real-world feature in the second coordinate frame based upon the relative motion characteristics.

13. The head-mounted display device of claim 12, wherein obtaining the representation of the real-world features further comprises tracking a location of each of the first and second real-world features relative to the camera over time based on image data from the camera.

14. The head-mounted display device of claim 12, wherein a first sensor of the plurality of sensors is associated with the first coordinate frame, and wherein a second sensor of the plurality of sensors is associated with the second coordinate frame.

15. The head-mounted display device of claim 12, wherein the plurality of sensors includes a depth camera.

16. The head-mounted display device of claim 12, wherein the plurality of sensors includes a global positioning sensor unit.

17. The head-mounted display device of claim 12, wherein the instructions are further executable to update the location at which the first virtual object is displayed based upon a detected change in a location of the first real-world feature relative to the first coordinate frame.

18. On a head-mounted display device, a method comprising:
obtaining via image data from a camera of the head-mounted display device a representation of real-world features in two or more coordinate frames;
displaying, on a see-through display of the head-mounted display device, a first virtual object at a location relative to a first real-world feature in a first coordinate frame in a field of view of the head-mounted display device and a second virtual object at a location relative to a second real-world feature in a second coordinate frame in the field of view of the head-mounted display device;
determining relative motion characteristics of the first coordinate frame and the second coordinate frame based upon the image data and data from one or more sensors;
distinguishing features in the first coordinate frame from features in the second coordinate frame based upon the relative motion characteristics; and
updating the location of the first virtual object based upon a relative motion of the first coordinate frame and updating the location of the second virtual object based upon a relative motion of the second coordinate frame.

19. The method of claim 18, further comprising merging the first and second coordinate frames into a single coordinate frame if the first and second coordinate frames have no relative motion based on the relative motion characteristics.

20. The method of claim 19, wherein the data from the one or more sensors includes acceleration data from an inertial measurement unit of the head-mounted display device, and wherein determining the relative motion characteristics comprises comparing the acceleration data to the image data.

* * * * *